United States Patent
Laurent

(10) Patent No.: US 7,334,012 B2
(45) Date of Patent: Feb. 19, 2008

(54) REVERSE DIVISION PROCESS

(75) Inventor: Pierre A. Laurent, Quin County Clare (IE)

(73) Assignee: Intel Corporation, Santa Clara, CA (US)

( * ) Notice: Subject to any disclaimer, the term of this patent is extended or adjusted under 35 U.S.C. 154(b) by 669 days.

(21) Appl. No.: 10/809,998

(22) Filed: Mar. 26, 2004

(65) Prior Publication Data

US 2005/0216543 A1 Sep. 29, 2005

(51) Int. Cl.
*G06F 7/52* (2006.01)
(52) U.S. Cl. .................................. 708/650; 708/200
(58) Field of Classification Search ................. 708/650
See application file for complete search history.

(56) References Cited

U.S. PATENT DOCUMENTS 5,815,163 A * 9/1998 Dao et al. .................... 345/443
6,401,185 B1 * 6/2002 Sexton et al. ............... 711/209
6,788,655 B1 * 9/2004 Underbrink ................. 370/324

* cited by examiner

*Primary Examiner*—Tan V. Mai
(74) *Attorney, Agent, or Firm*—Fish & Richardson P.C.

(57) ABSTRACT

Described herein is a method that includes storing partial quotients of a continued fraction in a first set of counters, initializing a second sets of counters with counter values, decrementing a target counter in the second set of counters to obtain a decremented counter value, and outputting a value that corresponds to a partial quotient in a first counter in the first set of counters. The value is based on the decremented counter value.

23 Claims, 4 Drawing Sheets

REVERSE DIVISION PROCESS

TECHNICAL FIELD

This patent application relates generally to a reverse division process that is based on continued fraction representations of quotients.

BACKGROUND

Any quotient of two numbers P and Q can be represented as a continued fraction. A continued fraction representation of the quotient of P/Q has the following form:

$$P/Q = a0 + \cfrac{1}{a1 + \cfrac{1}{a2 + \cfrac{1}{a3 + \cfrac{1}{a4 + \ldots}}}}$$

The coefficients a1, a2, a3, etc., are known as partial quotients. The partial quotients of a continued fraction may be represented in list notation, as follows:

$P/Q = [a0, a1, a2, a3, a4 \ldots a(k)]$ for $k > 4$.

Mathematics for generating a continued fraction is presented below, with reference to an example provided in prior art literature. In the following example, P has a value of 3796 and Q has a value of 1387. In this example, when 3796 is divided by 1387, the result is $3796 = 1387 * 2 + 1022$, where 1022 is the remainder. This equation can be rewritten as a continued fraction expansion, as follows:

$3796/1387 = 2 + 1022/1387 = 2 + 1/(1387/1022)$.

Proceeding in the same manner as above, $1387/1022 = 1 + 365/1022 = 1 + 1/(1022/365)$.

Thus, $3796/1387 = 2 + 1022/1387 = 2 + 1/(1 + 1/(1022/365))$.

Proceeding further in the same manner as above yields the following $1022 = 365 * 2 + 292$ $365 = 292 * 1 + 73$ $292 = 73 * 4$.

Making the appropriate substitutions in the above continued fraction representation and rewriting the equations without the parentheses yields $$3796/1387 = 2 + 1022/1387$$

$$= 2 + 1/1 + 1/(1022/365)$$

$$= 2 + 1/1 + 1/2 + 1/(365/292)$$

$$= 2 + \cfrac{1}{1 + \cfrac{1}{2 + \cfrac{1}{1 + \cfrac{1}{4}}}}$$

In list notation, the quotient of 3796/1387 is thus represented as [2, 1, 2, 1, 4].

DESCRIPTION

A reverse division process is described herein that uses continued fractions to obtain data. The reverse division process has broad applicability, but is particularly useful for processes that obtain and/or use periodic outputs, as described below. The mathematical basis for the reverse division process is illustrated as follows, using two integers P and Q.

The inverse of a continued fraction P/Q is defined by a sum of integer values $g(i)$ ($i \geq 1$) which fulfill the condition $g1 + \ldots + g(Q) = P$.

For values of i greater than Q, $g(i)$ can be defined recursively to be $g(i) = g(i-Q)$.

The $g(i)$ values comprise elements of a periodic suite, $S(n)$, of numbers having a period of Q, the sum of which is defined as follows:

$S(n) = g1 + g2 + \ldots + g(n-1) + g(n)$, $n > 2$ $S(0) = 0$

The choice of $g(i)$ values is not unique, but there is one set of values $g(i)$ which provides a lowest division error in the continued fraction (caused, e.g., by remainders in the division process of rational numbers). This set of values satisfies, for any value n and m where $n >= m+Q$, $|P - Q * ((S(n) - S(m))/(n-m))| < 1$.

By way of example, for a quotient of 34/6, a continued fraction representation is as follows:

$P/Q = 34/6 = 5 + 1/(1 + 1/2)$, or

[5,1,2] in list notation. In this example, there are several sets of possible $g(i)$ values. For example:

$6+6+6+6+5+5 = 34$ may be used as $g(i)$ values. Other sets of $g(i)$ values include, but are not limited to $$6+5+6+6+5+6 = 34$$
$$6+6+6+5+6+5 = 34$$
$$5+6+5+5+5+5 = 34$$

One way to reduce division error is to choose g(i) values from the set [a0, a0+1], and to interleave the g(i) values following the values of convergents p(k)/q(k) (defined below) of the continued fraction P/Q.

More specifically, in the continued fraction

[a1, a2, a3, . . . , ak, . . . an], where k≦n, the kth convergent (Ck=p(k)/q(K)) is the fraction that results from expanding the continued fraction to the partial quotient ak. By way of example, for the continued fraction $$P/Q = 1 + \cfrac{1}{2 + \cfrac{1}{3}}$$

three convergents, for k=1, 2 and 3 are

C1=1
C2=3/2
C3=10/7

To reduce division remainder errors, g(i) values, g(n), can be selected according to the following constraints:

g(n)=a0+1 when (S(n)−S(m))/(n−m) is equal to an even convergent p(2k)/q(2k) and g(m)=a0+1
g(n)=a0 otherwise In the example give above, the following g(i) values

6+5+6+6+5+6 satisfies the lowest error constraint.

Figure 1:
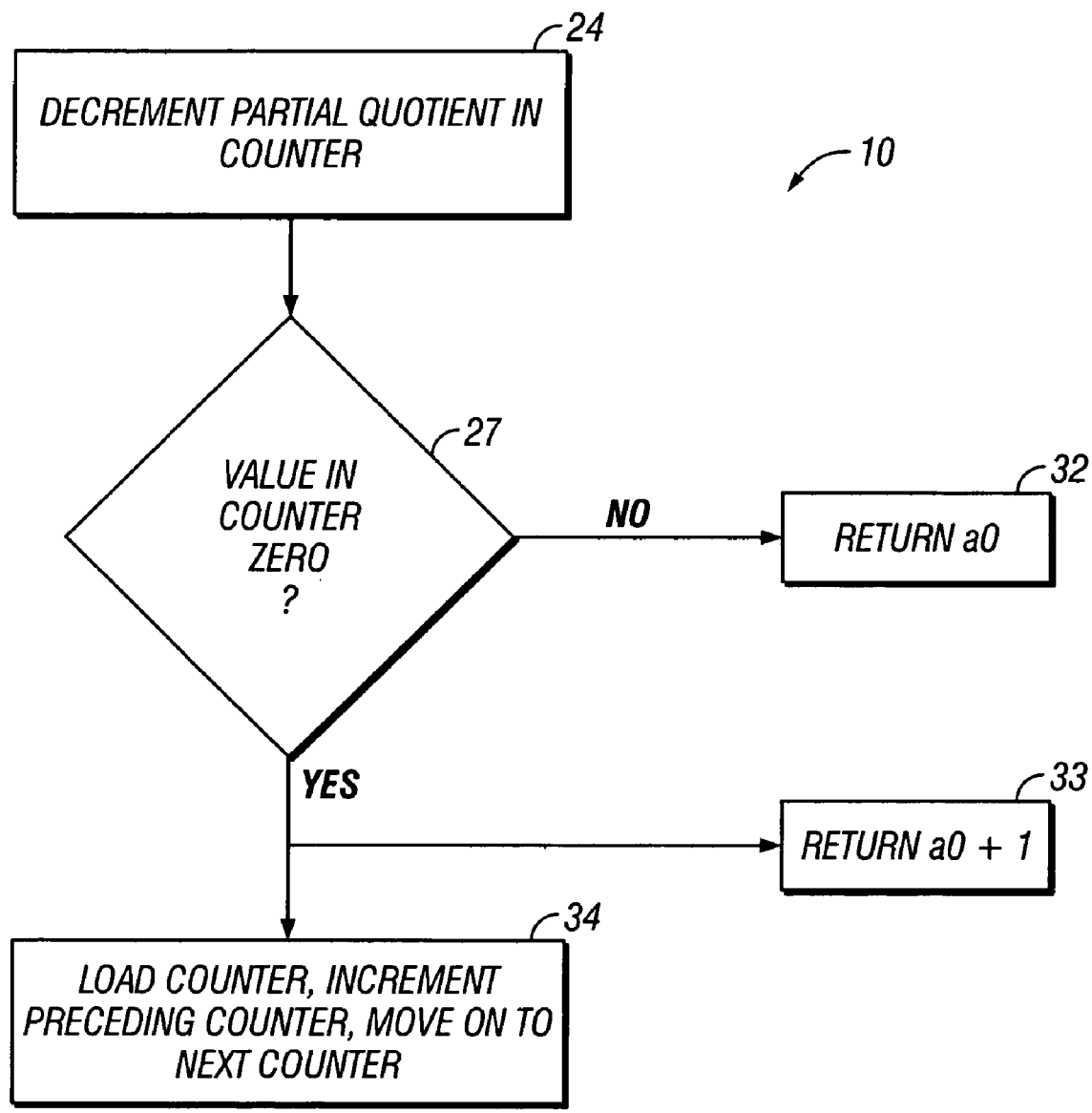
FIG. 1 is a flowchart of a process for performing a reverse division process.
Figure 2:
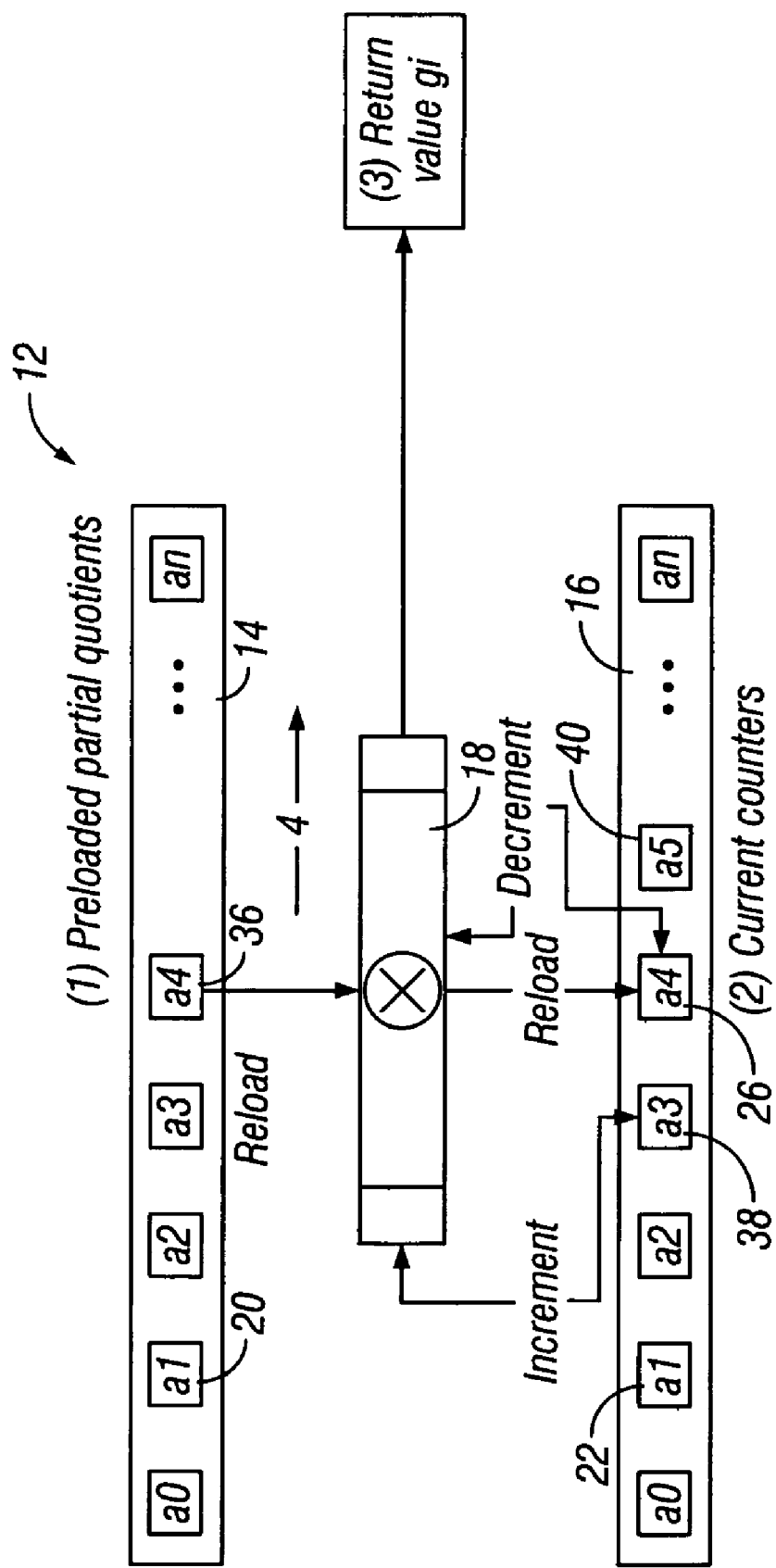
FIG. 2 is a block diagram of hardware that may be used to implement the reverse division process.

The foregoing g(i) selection process is approximated by process 10 shown in FIG. 1. Process 10 may be implemented in software or hardware. FIG. 2 shows hardware 12 that may be used to implement process 10. Hardware 12 includes first counters 14, second counters 16, and circuitry 18, such as a controller, that controls the counters. In the case of hardware, the counters comprise memory locations. Circuitry 18 controls inputs to, and outputs from, the counters.

Prior to executing process 10, first counters 14 are preloaded with partial quotients values a0 . . . an of a continued fraction P/Q. The partial quotient values may be determined manually or may be calculated using either hardware, software, or a combination thereof. Each of first counters 14 has a corresponding counter in second counters 16. Second counters 16 may be loaded with the same partial quotient values as first counters 14, or different counter values may be loaded depending on the application in which the counters are used.

For example, a graphical application may load a value (a(n)+1)/2 into the second counters. In this case, no round-off errors result in the continued fraction. To round to the least values, counters 16 may be initialized to 1. To round to the greatest values, counters 16 may be initialized to the corresponding values in counter 14. In order to synchronize to a clock, a clock generator may load different values, which are greater than the partial quotient values.

Circuitry 18 decrements (24) the partial quotient in an initial counter 22 and compares (27) the resulting value to zero. If the resulting value in counter 22 is not zero, circuitry 18 outputs (32) a g(i) value of a0.

If the resulting value in counter 22 is zero, circuitry 18 outputs (33) a g(i) value of a0+1. In this case, circuitry 18 loads (34) a value to counter 26 from its corresponding second counter 36. Circuitry 18 also increments the counter 38 that immediately precedes counter 26, namely counter 38, and moves on to the next counter 40. Process 10 is then repeated for the next counter 40.

Process 10 has applicability in any field to control values that are based on successive approximations of a rational quantity, such as periodic output. By way of example, process 10 may be used to generate clock signals. The generation of a universal asynchronous receiver-transmitter (UART) clock signal of 14.7456 megahertz (Mhz) from a 2333.3333 Mhz source (provided, e.g., by a crystal oscillator) produces an output clock signal for every 158.23906 input pulses. In this case, process 10 is used as a digital filter. For a P/Q=23333333/147456, the partial quotients are as follows:

[158,4,5,1,1,2,2,1,1,2,2,1,1,14].

Process 10 produces the following a0,a0+1 values

```
158 158 158 159 158 158 158 159 158 158 158 159 158 158 158 159 158 158 158 159
158 158 158 158 159 158 158 158 159 158 158 158 159 158 158 158 159 158 158 158
159 158 158 158 159 158 158 158 159 158 158 158 159 158 158 158 159 158 158
158 159 158 158 158 159 158 158 158 159 158 158 158 159 158 158 158 159 158 . . .
```

Figure 3:
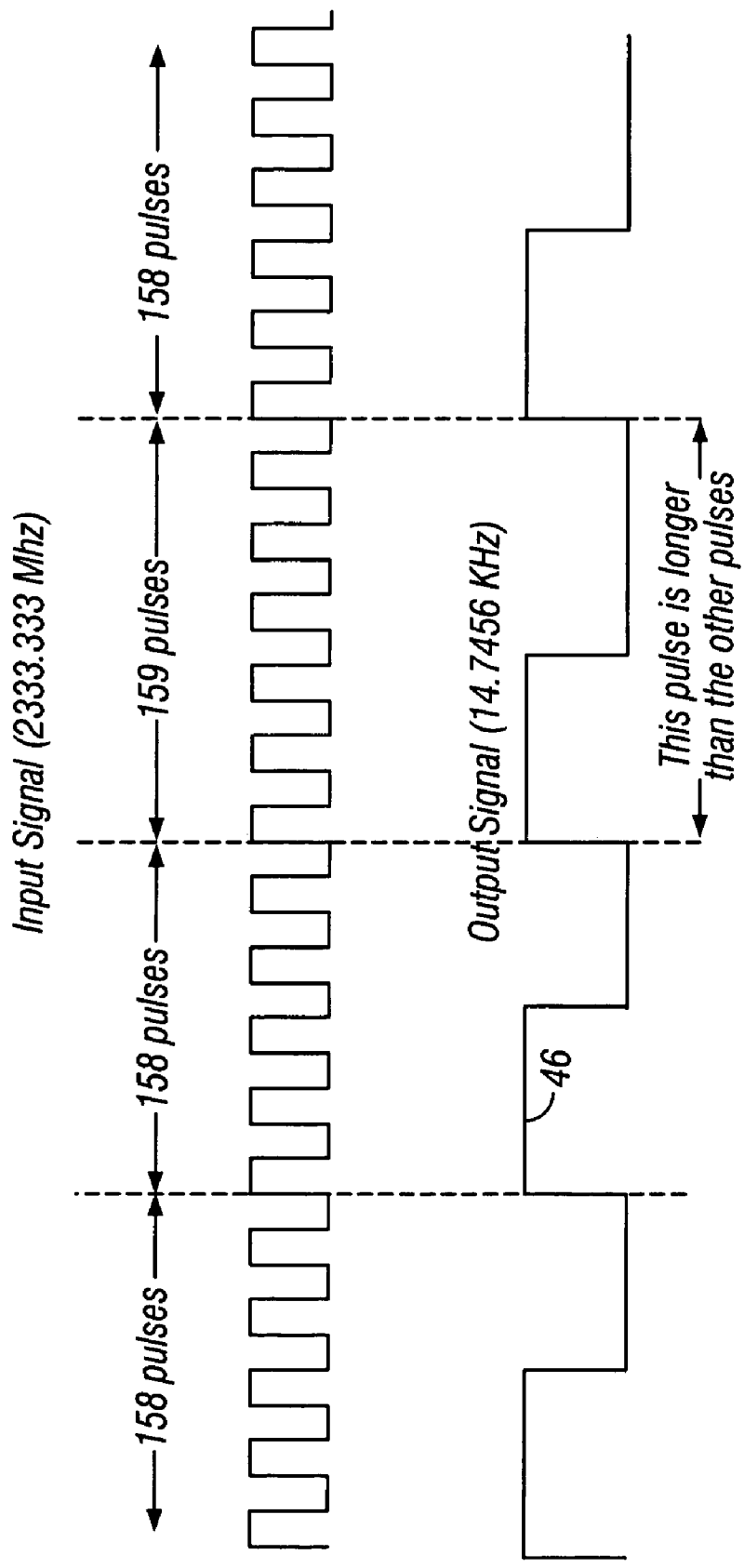
FIG. 3 is a graph showing signals generated via the reverse division process.

As shown in FIG. 3, these values result in an output clock signal 46 for every 158 (a0) or 159 (a0+1) input pulses of the 2333.3333 MHz source.

Process 10 may also be used in event synthesis applications, such as an asynchronous transfer mode (ATM) scheduler, to schedule simultaneous voice and data traffic. In this regard, an ATM scheduler typically organizes and controls traffic between different channels sharing a same communication medium. To transmit voice (e.g., a 64 Kilobits/second {Kbits/s} channel) over an asymmetric digital subscriber line (ADSL) (e.g., 796 Kbits/s line) that also transmits data, an ATM Quality of Service (QoS) scheduler handles a traffic ratio of, e.g., 48 payload bytes and 5 header bytes per ATM cell.

In a representative system, the following constraints may apply:

Voice bandwidth requirements:

64*1024 bits/sec/(8*48 bytes per cells)=170.66 cells per second.

ADSL bandwidth available (line rate):

796*1024 bits/sec/(8*(5+48) bytes per cell)=1922.41 cells per second

Bandwidth remaining for consumption by data is 1922.41−170.66=1751.75 cells per second.

An ATM scheduler regulates traffic to provide the correct bandwidth for voice and to ensure that it will be able to send voice cells at the correct rate, which in this instance is one cell of voice after an average of 10.26 data cells per second (the ratio of data to voice is 1751.75:170.66 which approximately equates to 10.26:1). For scheduling purposes, the data to voice ratio is calculated without losing the accuracy caused by floating point calculations.

The line traffic rate, ltr, is the total available bandwidth of the ADSL line in bits per second. The ltr in this example is:

ltr=(796*1024) bits per second

The voice traffic rate, vtr, is the number of bits consumed by voice traffic per second. The vtr in this example is:

vtr=(64*1024)*(53/48) bits per second

The data traffic rate, dtr, in bits per second uses the remainder of the bandwidth, as follows:

dtr=ltr−vtr dtr=(796*1024)−[(64*1024)*(53/48)]

The ratio data/voice is dtr/vtr is as follows:

$$\frac{(796*1024)-[(64*1024)*(53/48)]}{(64*1024)*(53/48)}$$

which results in the exact ratio 34816/3392 used to obtain the partial quotients for use by process 10. That is,

P/Q=34816/3392=(10, 3, 1, 3, 1, 2).

Using those partial quotients, process 10 produces the following a0, a0+1 values

| | | | | | | | | | | | | | | | | | | | |
|---|---|---|---|---|---|---|---|---|---|---|---|---|---|---|---|---|---|---|---|
| 10 | 1 | 11 | 1 | 10 | 1 | 10 | 1 | 10 | 1 | 11 | 1 | 10 | 1 | 10 | 1 | 10 | 1 | 11 | 1 | 10 | 1 |
| 10 | 1 | 11 | 1 | 10 | 1 | 10 | 1 | 10 | 1 | 11 | 1 | 10 | 1 | 10 | 1 | 10 | 1 | 11 | 1 | 10 | 1 |
| 10 | 1 | 10 | 1 | 11 | 1 | 10 | 1 | 10 | 1 | 10 | 1 | 11 | 1 | 10 | 1 | 10 | 1 | 11 | 1 | 10 | 1 |

Thus, process 10 results in either 10 or 11 ATM non-voice cells being transmitted between every voice cell transmission, denoted by "1".

Some standard scheduling algorithms, such as the Generic Cell Rate Algorithm (GCRA) defined by the ATM forum, which repetitively adds a constant, called the theoretical arrival time (TAT), to the cells, introduce a jitter effect. These jitter effects can be reduced by incrementing the TAT with outputs of process 10, as described below.

More specifically, the GCRA has a defect linked to a rounding error. Each time an ATM cell arrives, the TAT is incremented by a value "I". This value "I" is the result of a division between an expected traffic rate, a clock driving an external interface, and an internal clock used for time measurements. Whatever these values are, the TAT cannot be a value that can be represented as an integer or a floating point number. The TAT is a result of division, and ignoring a remainder in the division will lead to the following two problems: (1) either "I" is underestimated by a value δ and, after "N" iterations, an accumulated error N·δ will be greater than "I", thus making the algorithm miss a cell, which may be a non-conforming cell; or (2) either "I" is overestimated by a value δ and, after "M" iterations, an accumulated error M·δ will be greater than a limit "L", thus making the algorithm classify a cell as non-conforming.

Process 10 can be used to correct the value "I" and then determine a TAT value for a next cell. Because process 10 is not computationally intensive, it can be used in a network processor. Also, because process 10 can be re-initialized without being interrupted (i.e., re-initialized "on-the-fly"), process 10 can be used to compensate for a detected drive of an external clock used for transmission.

By way of example, assume the following, ATM can carry 16515072 cells every 53 seconds. This is the expected traffic rate (ETR). A device's internal clock is the result of a four-divider applied to a 2133.333 MHz clock source, resulting in a clock signal of about 533 Mhz. The internal clock has a frequency Ci of 2133333/(4·1000) Mhz. The internal clock will be incremented every 1000/Ci nanoseconds (ns).

The ATM transmission system has the following characteristics. The traffic rate is 16515072/53 cells per ns, and the ratio P/Q to be used in initialization of process 10 is Ci/ETR, or $$((2133333*1000000)/(4\cdot 1000))/16515072/53) =$$

$$1570370125/917504 = 1711.5678$$

Thus, there is one ATM cell every 1711 or 1712 internal clock ticks. By choosing to increment the TAT value by 1711, the TAT value will accumulate an error, resulting in ATM cells being considered late in arriving. By choosing to increment the TAT by a value of 1712, the TAT value will accumulate an error, resulting in cells being considered early in arriving. When the error is greater than a limit "L", ATM cells will be considered non-conforming. If the limit is set to 200 clock ticks, the problem may occur as frequently as 200/0.567 cells, or every 357 ATM cells.

Process 10 may be used to increment the TAT by returning either the 1711 value or the 1712 value. Either of these values may be added to the TAT, thereby reducing the long-term number of early cells and of late cells. That is, because the same value is not added every time, there is less of a chance of underestimation or overestimation error. In this regard, the continued fraction of 1570370125/917504 is

[1711,1,1,3,5,18,1,2,3,2,1,9,4].

This value is used at initialization of process 10. Process 10 then proceeds as described above.

Figure 4:
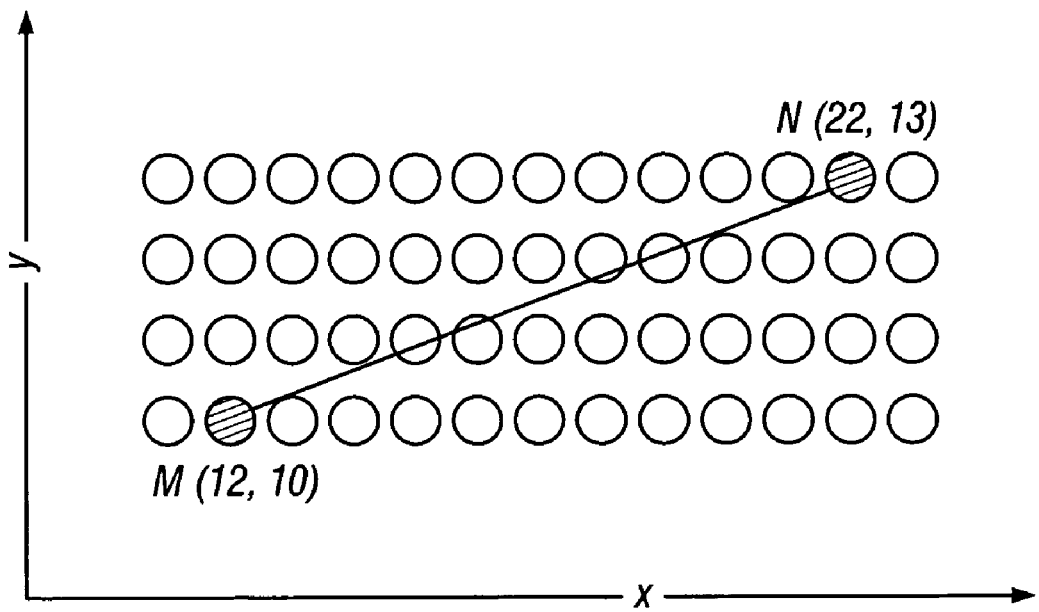
FIG. 4 is a graph showing a line between two points.

Process 10 may also be used in computer graphics. More specifically, referring to FIG. 4, in computer graphics, a line is drawn by illuminating pixels between two points M,N. To draw a line from the point M to the point N P/Q=(Nx−Mx)/(Ny−My)=10/3

A continued fraction expansion results in the following continued fraction

P/Q=10/3=[3,3].

Applying the partial quotients of the continued fraction to process 10 results in the following output a0,a0+1:

3 4 3 3 4 3 3 4 3 3 4 3 3 4 3 3 4 3 3 4 3 3 4 3 . . .

Figure 5:
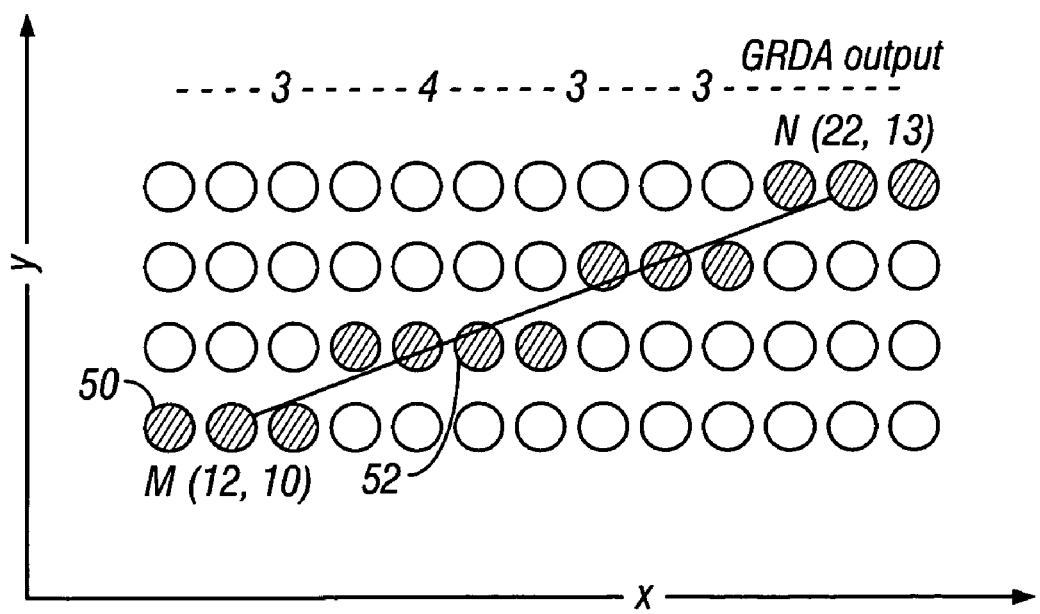
FIG. 5 shows the graph of FIG. 4 in which pixels selected via the reverse division process have been illuminated to generate the line.

As shown in FIG. 5, the values output by process 10 are used to determine a number of (horizontal) pixels 50, 52 to illuminate on a path from point M to point N. Process 10 can be applied to draw lines with a slope greater than 45° by illuminating pixels of a vertical line. Representative computer code that may be used to draw lines in conjunction with process 10 is shown in attached Appendix C.

Process 10 not limited to use with the hardware and software of described herein; it may find applicability in any computing or processing environment.

Process 10 can be implemented in digital electronic circuitry, or in computer hardware, firmware, software, or in combinations of them. Process 10 can be implemented as a computer program product or other article of manufacture, e.g., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Process 10 can be performed by one or more programmable processors executing a computer program to perform functions. Process 10 can also be performed by, and apparatus of the process 10 can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer include a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks.

Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

Process 10 can be implemented in a computing system that includes a back-end component, e.g., as a data server, or that includes a middleware component, e.g., an application server, or that includes a front-end component, e.g., a client computer having a graphical user interface or a Web browser, or any combination of such back-end, middleware, or front-end components.

The components of the system can be interconnected by any form or medium of digital data communication, e.g., a communication network. Examples of communication networks include a local area network ("LAN") and a wide area network (WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Representative C++ code to implement process 10 is shown in attached Appendix A; and representative Verilog code to implement process 10 is shown in attached Appendix B.

Other embodiments not described herein are also within the scope of the following claims. For example, the blocks of FIG. 1 may be reordered to achieve the same result. The partial quotients may be generated using any process including, but not limited to, the Euclidian process described in the background, the Greatest Common Denominator (GCD) process, binary reduction, and subtractions.

As noted above, the processes described herein are applicable in a variety of technologies. For example, in addition to the technologies noted above, the processes may be used to distribute P identical objects into Q sets, to arbitrate event collisions, to perform clock correction, and to correct some types of floating-point rounding errors.

APPENDIX A

```
#define MAX_DIV_DEPTH 23
static UINT32 divReload[MAX_DIV_DEPTH];
static UINT32 divCurrent[MAX_DIV_DEPTH];
static UINT32 divDepth;
/* --------------------------------------------
 * initialisations : compute the partial quotients a(i)
 */
static void divR (UINT32 v1, UINT32 v2)
{
   assert(divDepth < MAX_DIV_DEPTH);
   divReload[divDepth++] = v1 / v2;
   v2 = v1 % v2;
   if (v1 != 0 && v2 != 0) divR (v2, v1);
}
/* --------------------------------------------
 * initialization entry point
 */
void GRDASet (UINT32 P, UINT32 Q)
{
   assert (P>=Q);
   if (P == 0 || Q == 0)
   {
      divDepth = 1; divReload[0] = 0;
   }
   else
   {
      divDepth = 0; divR (P, Q);
      for (int i = 0; i < divDepth; i++) divCurrent[i] =
(divReload[i] + 1)/2;
   } /* end of if-else(v1) */
}
/* --------------------------------------------
 * Get successive values g(i)
 */
UINT32 GRDAGet (void)
{
   /* process the first coefficients 0 and 1 */
   if (divDepth < 2 || --divCurrent[1] != 0) return
divReload[0];
   divCurrent[1] = divReload[1];
   /* process the remaining coefficients */
   int i = 1;
   while (++i < divDepth)
```

APPENDIX A-continued

```
    {
        if (--divCurrent[i] != 0) break;
        divCurrent[i] = divReload[i];
        divCurrent[i - 1]++;
    }
    return divReload[0] + 1;
}
```

APPENDIX B

```
// GRDA Initialisation (P/Q = 2133300/32768)
    divReload[0] = 65;
    divReload[1] = 9;
    divReload[2] = 1;
    divReload[3] = 2;
    divReload[4] = 3;
    divReload[5] = 1;
    divReload[6] = 1;
    divReload[7] = 1;
    divReload[8] = 2;
    divReload[9] = 1;
    divReload[10] = 2;
    divReload[11] = 2;
    divDepth = 12;
    for (i = 0; i < divDepth; i = i + 1)
    begin
        divCurrent[i] = 1;
        divCurrent[i] = divReload[i] / 2 + 1;
    end
// GRDA Core
task GRDA_Get;
    output [0:31] grda_val;
    reg[0:4] i;
    begin
        divCurrent[1] = divCurrent[1] - 1;
        if (divDepth < 2 || divCurrent[1] != 0)
        begin
            grda_val = divReload[0];
        end
        else
        begin
            grda_val = divReload[0] + 1;
            divCurrent[1] = divReload[1];
            divCurrent[2] = divCurrent[2] - 1;
            for (i = 2; i < divDepth && divCurrent[i] == 0; i = i + 1)
            begin
                divCurrent[i - 1] = divCurrent[i - 1] + i;
                divCurrent[i] = divReload[i];
                divCurrent[i + 1] = divCurrent[i + 1] - 1;
            end
        end
    end
endtask
```

APPENDIX C

```
// Initializations
    GRDASet (P,Q);
    // Draw the first half segment
    x = drawHorizontalSegment(Mx, My, (GRDAGet( ) + 1)/ 2);
    y = My;
    // iterate through segments
    while( ++y < Ny) x = drawHorizontalSegment(x, y, GRDAGet( ));
    // Draw the last half segment
    drawHorizontalSegment(x, Ny, Nx - x)
```

What is claimed is:

1. A method comprising:

storing partial quotients of a continued fraction in a first set of counters;

initializing a second set of counters with counter values;

decrementing a target counter in the second set of counters to obtain a decremented counter value; and outputting a value that corresponds to a partial quotient in a first counter in the first set of counters, the value being based on the decremented counter value;

wherein the value (ii) comprises part of a clock signal that is used to clock digital circuitry, (ii) is used to correct a clock signal for clocking digital circuitry, (iii) is used to schedule network traffic, or (iv) is used in a computer graphics application.

2. The method of claim 1, further comprising:

determining the value based on the decremented counter value.

3. The method of claim 2, wherein determining the value comprises:

determining if the decremented counter value is zero;

assigning the value to be equal to the partial quotient in the first counter if the decremented counter value is not zero; and assigning the value to be equal to the partial quotient in the first counter plus one if the decremented counter value is zero.

4. The method of claim 3, wherein if the decremented counter value is zero, the method further comprises:

loading the target counter with a partial quotient from a counter in the first set of counters that corresponds to the target counter.

5. The method of claim 4, wherein if the decremented counter value is zero, the method further comprises:

incrementing a value in a counter that precedes the target counter in the second set of counters.

6. The method of claim 5, wherein the value is incremented in a counter that immediately precedes the target counter.

7. The method of claim 1, further comprising:

decrementing a counter value in a counter that follows the target counter in the second set of counters to obtain a second decremented counter value; and outputting a value that corresponds to a partial quotient in a first counter, the value being based on the second decremented counter value from the second set of counters.

8. The method of claim 1, wherein the counters comprise software counters.

9. An article comprising a machine-readable medium that stores executable instructions that cause a machine to:

store partial quotients of a continued fraction in a first set of counters;

initialize a second set of counters with counter values;

decrement a target counter in the second set of counters to obtain a decremented counter value; and output a value that corresponds to a partial quotient in a first counter in the first set of counters, the value being based on the decremented counter value;

wherein the value (ii) comprises part of a clock signal that is used to clock digital circuitry, (ii) is used to correct a clock signal for clocking digital circuitry, (iii) is used to schedule network traffic; or (iv) is used in a computer graphics application.

10. The machine-readable medium of claim 9, further comprising instructions to:

determine the value based on the decremented counter value.

11. The machine-readable medium of claim 10, wherein determining the value comprises:

determining if the decremented counter value is zero;
assigning the value to be equal to the partial quotient in the first counter if the decremented counter value is not zero; and
assigning the value to be equal to the partial quotient in the first counter plus one if the decremented counter value is zero.

12. The machine-readable medium of claim 11, wherein the machine-readable medium further comprises instructions to:
load the target counter with a partial quotient from a counter in the first set of counters that corresponds to the target counter if the decremented counter value is zero.

13. The machine-readable medium of claim 12, wherein the machine-readable medium further comprises instruction to:
increment a value in a counter that precedes the target counter in the second set of counters if the decremented counter value is zero.

14. The machine-readable medium of claim 13, wherein the value is incremented in a counter that immediately precedes the target counter.

15. The machine-readable medium of claim 11, further comprising instructions to:
decrement a counter value in a counter that follows the target counter in the second set of counters to obtain a second decremented counter value; and
output a value that corresponds to a partial quotient in a first counter, the value being based on the second decremented counter value from the second set of counters.

16. The machine-readable medium of claim 11, wherein the counters comprise software counters.

17. An apparatus comprising:
a first set of counters to store partial quotients of a continued fraction;
a second set of counters to store counter values, the second set of counters corresponding to the first set of counters; and
circuitry to decrement a counter value in a target counter in the second set of counters to obtain a decremented counter value, and to output a value that corresponds to a partial quotient in a first counter in the first set of counters, the value being based on the decremented counter value.

18. The apparatus of claim 17, wherein the circuitry determines the value based on the decremented counter value.

19. The apparatus of claim 18, wherein determining the value comprises:
determining if the target counter has a counter value of zero;
assigning the value to be equal to the partial quotient in the first counter if the target counter does not have a counter value of zero; and
assigning the value to be equal to the partial quotient in the first counter plus one if the target counter has a counter value of zero.

20. The apparatus of claim 19, wherein if the target counter has a counter value of zero, the circuitry loads the target counter with a partial quotient from a counter in the first set of counters that corresponds to the target counter.

21. The apparatus of claim 20, wherein if the target counter has a counter value of zero, the circuitry increments a value in a counter that precedes the target counter in the second set of counters.

22. A clock generating circuit comprising:
an oscillator to produce a clock signal;
memory comprising a first set of counters and a second set of counters; and
a controller to:
generate partial quotients of a continued fraction based on the clock signal;
store the partial quotients in the first set of counters;
store counter values in the second set of counters;
decrement a counter value in a target counter in the second set of counters to obtain a decremented counter value; and
output a value that corresponds to a partial quotient in a first counter in the first set of counters, the value being based on the decremented counter value;
wherein the value (ii) comprises part of a clock signal that is used to clock digital circuitry, (ii) is used to correct a clock signal for clocking digital circuitry, (iii) is used to schedule network traffic, or (iv) is used in a computer graphics application.

23. The clock generating circuit of claim 22, wherein the controller is configured to:
determine if the decremented counter value is zero;
assign the value to be equal to the partial quotient in the first counter if the decremented counter value is not zero; and
assign the value to be equal to the partial quotient in the first counter plus one if the decremented counter value is zero.

* * * * *